United States Patent [19]

Meyer

[11] Patent Number: 4,882,536
[45] Date of Patent: Nov. 21, 1989

[54] CAPACITIVE DETECTOR OF POSITION HAVING ELECTRODES AND CIRCUITRY FORMED ON A COMMON INTEGRATED CIRCUIT

[76] Inventor: Hans U. Meyer, 42 rue de Lausanne, 1110, Morges, Switzerland

[21] Appl. No.: 284,782

[22] Filed: Dec. 12, 1988

Related U.S. Application Data

[63] Continuation of Ser. No. 036,806, Apr. 10, 1987, abandoned.

[30] Foreign Application Priority Data

Apr. 10, 1986 [CH] Switzerland .......................... 0141286

[51] Int. Cl.⁴ .............................................. G01R 27/26
[52] U.S. Cl. ................................. 324/61 R; 324/61 P; 340/870.37; 341/15
[58] Field of Search ............................ 324/61 R, 61 P; 361/278, 280, 287, 290, 296, 298; 340/870.37, 825.33; 235/451; 341/15; 73/336.5; 33/125 C

[56] References Cited

U.S. PATENT DOCUMENTS

| | | | |
|---|---|---|---|
| 4,420,754 | 12/1983 | Andermo | 324/61 RX |
| 4,543,526 | 9/1985 | Burckhardt | 340/870.37 X |
| 4,586,260 | 5/1986 | Baxter et al. | 33/125 C |
| 4,636,792 | 1/1987 | Watson | 340/870.37 |
| 4,638,249 | 1/1987 | Tanaka et al. | 340/870.37 X |
| 4,694,275 | 9/1987 | Cox | 340/870.37 X |
| 4,743,838 | 5/1988 | Eckerle | 340/870.73 X |
| 4,788,546 | 11/1988 | Sasaki | 340/870.37 |

FOREIGN PATENT DOCUMENTS 0103318 8/1981 Japan .............................. 340/870.37

Primary Examiner—Reinhard J. Eisenzopf
Assistant Examiner—Jack B. Harvey
Attorney, Agent, or Firm—Gifford, Groh, Sheridan, Sprinkle and Dolgorukov

[57] ABSTRACT

The capacitive detector of position between two supports (10 and 30) comprises a series of electrodes (11) on support (10) and a series of electrodes (13) on support (30). The electrodes (13) of support (30) and electronic circuitry (21) are formed on the lower face of an integrated circuit substrate (20) constituting the electronic part intended for the application of incremental potentials to the electrodes (13).

9 Claims, 3 Drawing Sheets

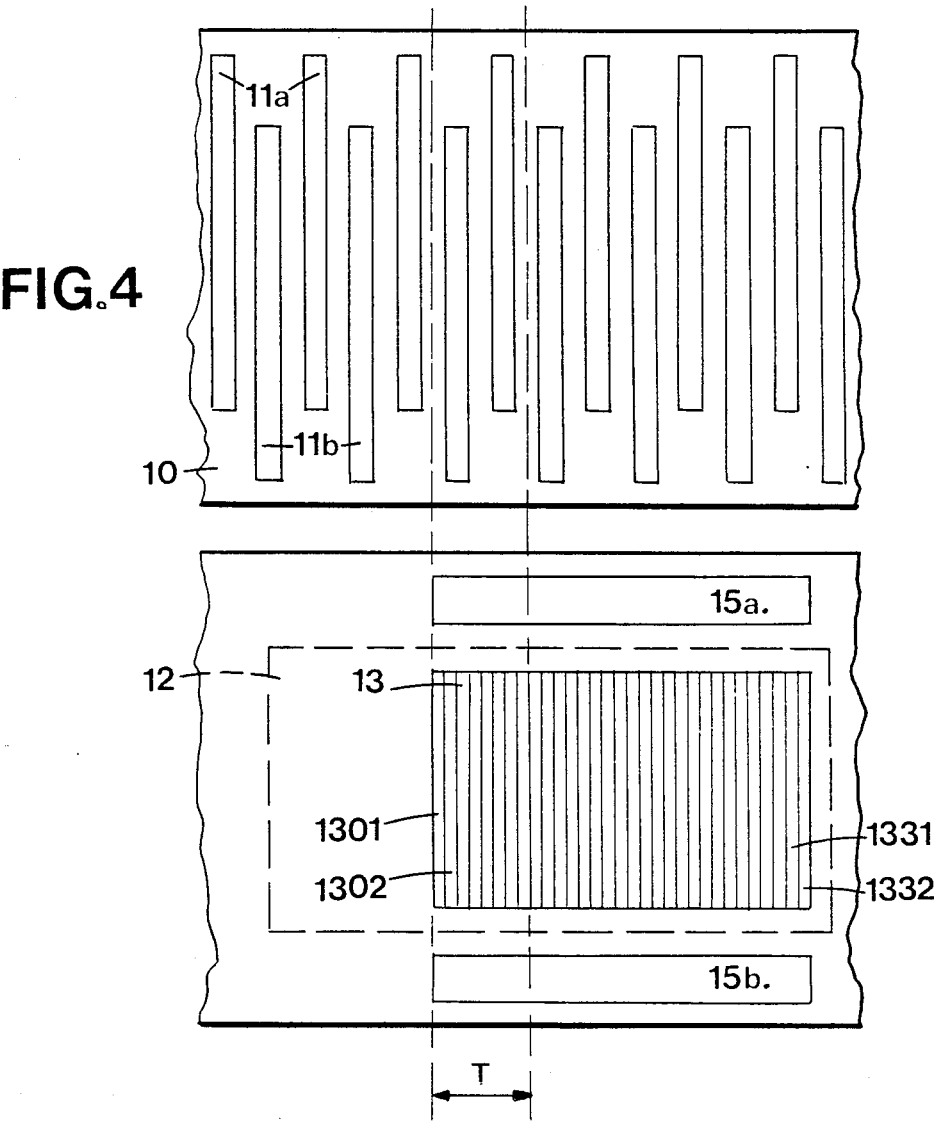

CAPACITIVE DETECTOR OF POSITION HAVING ELECTRODES AND CIRCUITRY FORMED ON A COMMON INTEGRATED CIRCUIT

This is a continuation of co-pending application Ser. No. 036,806 filed on Apr. 10, 1987, now abandoned.

The invention concerns a capacitive detector of position, of the incremental type, consisting of a rule provided with a series of electrodes and a cursor provided with the electronic part of the detector as well as electrodes, the two surfaces of electrodes facing each other. Detectors of this type have been described, for example in Swiss Pat. Nos. 643 652 and 651 136.

In order to obtain a very fine measurement of position, it is desirable for the electrodes to be as thin as possible, but one is limited in this direction by the difficulty in effecting the connections between the said electrodes and the circuits intended to apply the desired potentials to them.

The present invention aims at simplifying this problem and making it possible to realize very thin electrodes, so that more than a hundred electrodes can be realized over a 1 mm distance.

To this effect, the detector according to the invention is characterized in that at least part of the cursor electrodes and at least part of the electronic circuitry is provided in a common integrated circuit, placed facing the rule.

This arrangement has further advantages such as;
very good precision in the division, making it possible to obtain good linearity,
the dimensions of the detector are extremely reduced;
the connections between the electronic circuitry and the electrodes, on a common integrated circuit, present no difficulty: the electrodes can therefore be addressed individually, thus making it possible to obtain very high resolutions, which eliminate the need for interpolation;
the solution is less expensive and more reliable as a result of the reduced number of connections outside the integrated circuit.

Other advantages of the present invention spring up from the particularities making the object of the dependent claims.

The attached drawing shows a known type detector and, by way of example, several embodiments of the detector which is the object of the invention.

FIG. 3 shows, in cross-section, an embodiment of the assembling of a detector.

FIG. 4 shows a possible arrangement of the electrodes.

Figure 1:
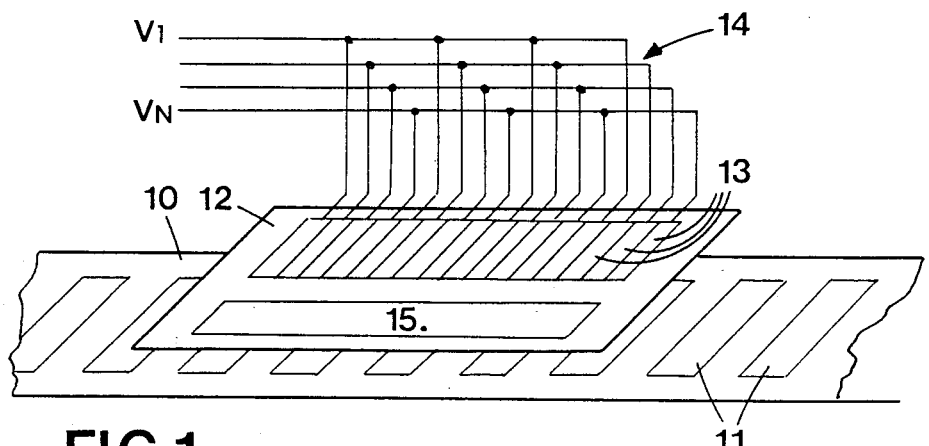
FIG. 1 shows a known arrangement of electrodes.

The known capacitive detector of position shown in FIG. 1 is of the incremental type and is generally provided with two electrode surfaces facing each other. One of the surfaces serves as a rule 10, the other as a cursor 12. both surfaces are provided with electrodes 11, 13. The relative position of the rule 10 and the cursor 12 is determined by electronic means, as described in Swiss Pat. No. 651 136 for example. For instance, the electrodes of the cursor 12 can be coupled to driving signals and the signals picked up by the electrodes of the rule 10 can be capacitively read by a collector electrode 15 placed on the cursor 12; this arrangement has the advantage of not needing any connections between the cursor and the rule.

Generally, the electrodes are linearly arranged with a given step, the step of the cursor electrodes being N times smaller than the step of the rule electrodes. The cursor electrodes are coupled to N driving signals V1–VN, each Nth electrode in the cursor being connected to the same driving signal. In this arrangement, the configuration of the electric field can only be changed by increments corresponding to the step of the cursor electrodes, or to a half of this step in the case of a differential detector.

Figure 2:
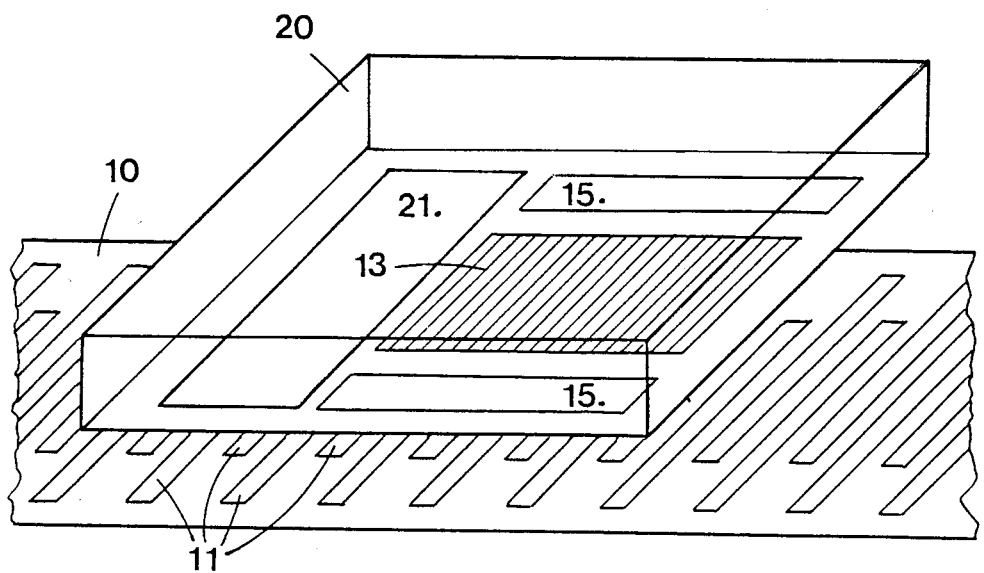
FIG. 2 shows a first embodiment illustrating the principle of the detector which is the object of the invention. For clarity, the integrated circuit 20 is shown in transparency.

The new device, shown in FIGS. 2 and 3, comprises a rule 10 provided with electrodes 11 and an integrated circuit 20 disposed facing the rule. The surface 12 of the integrated circuit 20 which faces rule 10 carries the electrodes 13, an electronic part 21 incorporating at least the means for generating the driving signals and the connections of the electrodes 13. These electrodes 13 are preferentially formed in the metalization layer of the integrated circuit. The connections, which must pass underneath this metalization layer, are preferentially formed by channels diffused in the semiconductor and connected to their respective electrodes. The collector electrodes 15 can be disposed either on the integrated circuit, as in FIG. 2, or outside this circuit, since their geometry is not critical and there are no connection problems.

The electrodes 11 being individually addressable, the configuration of the electric field can be altered by increments which are much finer than the step of the cursor electrodes.

Provided that the detector is protected from external effects susceptible of perturbing the operation of the integrated circuit (light, humidity, dust), one can do without a protection layer, other than the passivation one, on the integrated circuit and avoid taking out the external connections (bonding) at the place where no rule is provided; this implies that at least one part of the surface 12 of the integrated circuit does not face the rule, so that a free space is left for the external connections, or then that these external connections (bonding) come out practically tangentially to the integrated circuit's surface.

FIG. 3 shows a solution using the TAB (Tabe Automated Bonding) assembling technique: the integrated circuit 20 comprises raised contacts 32 connected to a flexible circuit 31 attached to the body of the cursor 30. The surface of the integrated circuit is protected by a layer of synthetic resin 33.

The feeble height of the contacts and of the protection layer ensures an adequate coupling between the electrodes 11 of the rule 10 and those 13 of the integrated circuit 20.

The electrode arrangement shown in FIG. 1 can be used to achieve a high digital resolution, making it possible to avoid an analogic interpolation. There is provided a periodicity T, given by a group of two electrodes 11a and 11b, on rule 10. Within this same period T, there is a group of eight electrodes on the cursor 12, for instance, electrodes 1301 to 1308. It will be appreciated that the electrodes of rule 10 and those of cursor 20, which are shown here side by side, are actually superimposed as shown in FIG. 2. If a substantially periodical configuration of the electric field, with period T, is generated on the 32 electrodes 1301 to 1332 (4 groups of 8 electrodes), the signals coupled to the even 11a and odd 11b electrodes of the rule will be in phase opposition; the even and odd electrodes are laterally shifted relative to one another, which makes it possible to read the rule's even electrodes 11a with one collector electrode 15b of the cursor, and the odd electrodes 11b with the other collector electrode 15a. The arrangement is thus differential, but the following description is equally valid for a non-differential arrangement, comprising a single electrode 11 by T step and only one collector electrode 15, the only difference being that the resolution that can be obtained without interpolation, for the same configuration of the cursor electrodes 13, will be twice lower for a non-differential system. The reason for this is that, in a non-differential arrangement, the picked up signal originates from only half of the electrodes 13 in the cursor.

It will be appreciated that the number of eight electrodes 13 by step is small and is only used to illustrate the working principle. In practice, the methods for manufacturing integrated circuits make it possible to have a very small step of the electrodes 13, which is not the case for the step T of the rule's electrodes, since the field generated by an electric configuration of period T (a group of electrodes) decreases practicaly exponentially with increasing distance from the surface: for a distance increase of 0.11×T, the field decreases by a half. This means that, for a separation of the order of 0.1 mm between the rule and the cursor, the step T will be of the order of 1 mm; on the other hand, it is of course possible to have 100 electrodes or more, by millimeter, on the integrated circuit.

Figure 5:
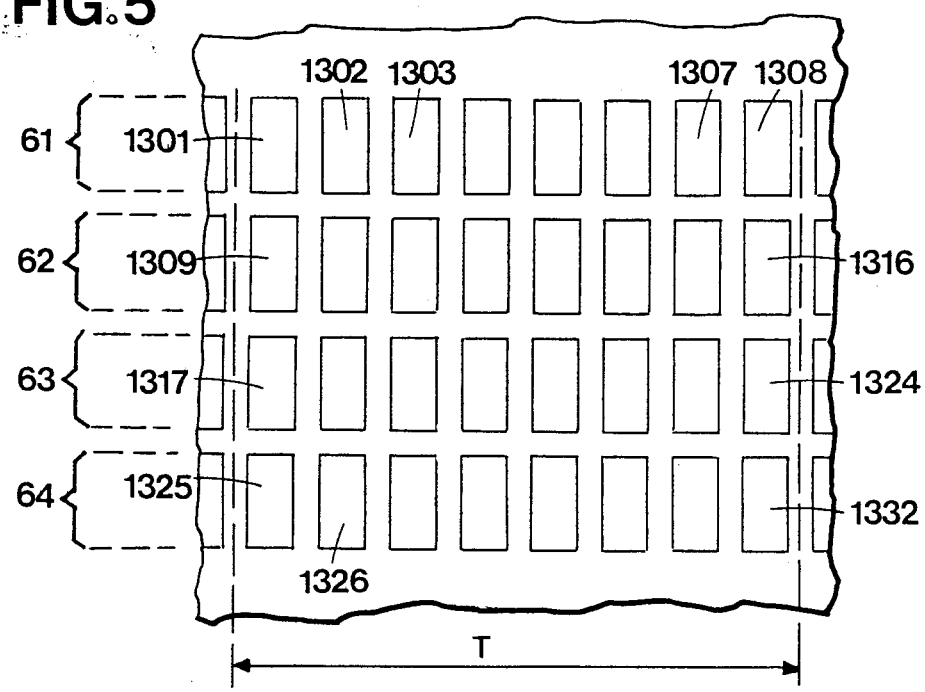
FIG. 5 shows another arrangement.

FIG. 5 shows another arrangement of the electrodes, in which the groups of eight electrodes are disposed in rows 61–64 juxtaposed in the same interval T. Each row is parallel to the displacement axis. The number of groups of rows possible can be very high.

This arrangement allows a much higher precision of measurement, because a compensation of the manufacturing tolerances takes place. Furthermore, it opens additional possibilities in the application of exciting potentials to the electrodes.

Figure 6:
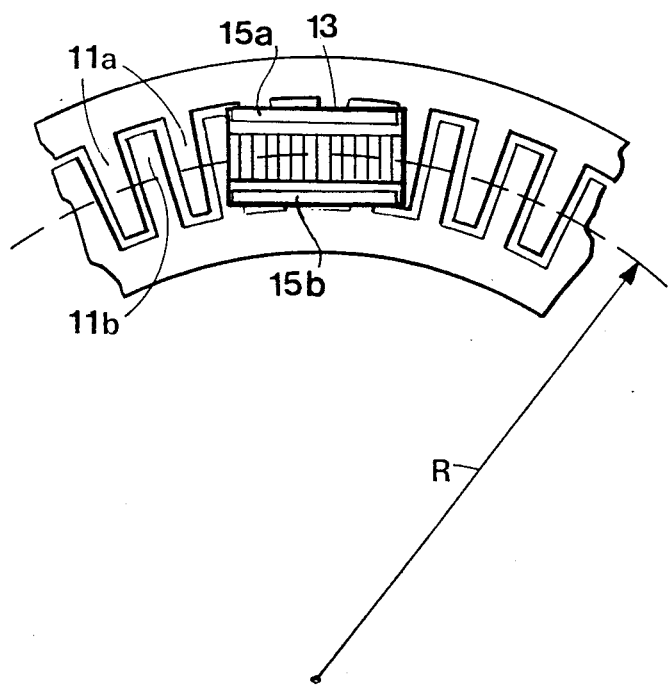
FIG. 6 shows the rule electrodes of a circular detector and their relation to the cursor electrodes.

The realization of a circular detector is equally possible, with the same integrated circuit, therefore with the same electrode arrangement as that used in a linear detector, provided that the average radius R is well above the dimensions of the arrangement of electrodes, to restrict the effects of non-alignment between the electrodes of the rule and those of the cursor's integrated circuit, as shown in FIG. 6, where the surface covered by the electrodes 13, 15a, 15b can also be seen. An adaptation of the integrated circuit's arrangement to the particular case can also be devised.

In a variant, the rule electrodes could be disposed on a cylindrical surface, provided that the curvature would not be too strong relative to the length, in the direction of measurement, of the integrated circuit's electrode arrangement.

It is obvious that the dimensions of the detector make it possible to design systems comprising several detectors. A possible application would be a circular detector provided with at least two integrated circuits distributed on the periphery, in order to achieve better precision by combining the results of each circuit.

Another application would be the making of an absolute system by combining two detectors provided with rules having a slightly different step but identical integrated circuits, for economical reasons. The difference between the interpolation values of the two circuits would then give the coarse position, one of the interpolation values providing the fine position; by combining the two, one would get the absolute position.

I claim:

1. A capacitive detector of the relative position between two supports, one of these supports being displaceable along the other, one support comprising a series of electrodes, the second support being provided with electrodes and electronic circuitry making it possible to apply incremental potentials to the latter electrodes, the electrodes in one support facing those in the other support, characterized in that the electrodes on the second support and the electronic circuitry for applying the incremental potentials to the electrodes on the second support are formed in a common integrated circuit semiconductor substrate disposed facing the electrodes on the other support.

2. Device according to claim 1, characterized in that said electronic circuitry provided on the integrated circuit is connected to each electrode provided on said integrated circuit and generates the signals for each electrode.

3. Device according to claim 1, characterized in that the surface of the integrated circuit facing said other support is protected from external effects by at least one protection layer, said layer being spaced from said one of said supports.

4. Device according to claim 3, characterized in that the assembling of the integrated circuit is done by TAB technology, which consists in connecting the integrated circuit to the conductors of a flexible circuit, said integrated circuit and said flexible circuit being assembled on the surface of a cursor which faces said other support.

5. Device according to claim 2, characterized in that the electrodes provided on the integrated circuit present an elongated rectangular shape perpendicular to the axis of relative displacement between said supports and are arranged in series along the axis of displacement.

6. Device according to claim 2, characterized in that the electrodes form several juxtaposed rows, each row being parallel to the axis of displacement.

7. Device according to claim 5, characterized in that the electronic circuitry generates on the electrodes a substantially periodical electric configuration created from at least two different voltages, said configuration being shiftable by modification electrode by electrode.

8. Device according to claim 1, characterized in that the electrodes of said one support are disposed on a rotation body whose radius well exceeds the dimensions of the electrodes of said other support, the latter electrodes remaining flat and parallel between themselves.

9. Device according to claim 6, characterized in that the electronic circuitry generates on the electrodes a substantially periodical electric configuration created from at least two different voltages, said configuration being shiftable by modification electrode by electrode.

* * * * *